United States Patent
Venkataraman (10) Patent No.: US 9,112,661 B1
(45) Date of Patent: *Aug. 18, 2015

(54) METHOD AND APPARATUS FOR DATA RECEPTION IN HIGH-SPEED APPLICATIONS

(71) Applicant: MARVELL INTERNATIONAL LTD., Hamilton (BM)

(72) Inventor: Jagadish Venkataraman, San Jose, CA (US)

(73) Assignee: MARVELL INTERNATIONAL LTD. (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/283,629

(22) Filed: May 21, 2014

Related U.S. Application Data (63) Continuation of application No. 12/986,866, filed on Jan. 7, 2011, now Pat. No. 8,737,542.

(60) Provisional application No. 61/294,423, filed on Jan. 12, 2010.

(51) Int. Cl.
*H03D 1/00* (2006.01)
*H04L 27/06* (2006.01)
*H04L 1/00* (2006.01)

(52) U.S. Cl.
CPC .................................. *H04L 1/0054* (2013.01)

(58) Field of Classification Search
CPC ... H04L 1/0054; H04L 1/0045; H04L 1/0047; H04L 1/0059
USPC ................. 375/341, 262, 348, 232, 233, 234; 708/322, 323; 455/63.1, 296, 307
See application file for complete search history.

(56) References Cited

U.S. PATENT DOCUMENTS

| | | | |
|---|---|---|---|
| 5,822,143 | A | 10/1998 | Cloke et al. |
| 6,072,828 | A | 6/2000 | Chun |
| 6,151,370 | A | 11/2000 | Wei |
| 7,656,945 | B1 * | 2/2010 | Warner et al. ................. 375/233 |
| 2004/0017863 | A1 | 1/2004 | Learned |
| 2006/0083337 | A1 * | 4/2006 | Higashino ..................... 375/341 |
| 2006/0256896 | A1 * | 11/2006 | Venkataramani et al. .... 375/341 |
| 2008/0112513 | A1 | 5/2008 | Moon et al. |
| 2009/0024017 | A1 | 1/2009 | Ruffini et al. |
| 2011/0002061 | A1 * | 1/2011 | Ozdemir ........................ 360/31 |

* cited by examiner

*Primary Examiner* — Phuong Phu (57) ABSTRACT

A method and apparatus for receiving data in high-speed applications wherein an analog-to-digital converter (ADC) samples a received signal and a data decoder implemented with a tree search algorithm detects the bits of the sampled data for timing recovery. In some embodiments, a Viterbi detector is implemented to provide accurate bit detection for data output while tree search detected data is used to determine the optimal sampling phase for the ADC. In some embodiments, after the phase acquisition stage of timing recovery has completed, the tree search decoder may decrease the rate of data detection to maintain phase tracking.

20 Claims, 9 Drawing Sheets

METHOD AND APPARATUS FOR DATA RECEPTION IN HIGH-SPEED APPLICATIONS

CROSS-REFERENCE TO RELATED APPLICATIONS

This disclosure is a continuation of U.S. Non-Provisional application Ser. No. 12/986,866 filed on Jan. 7, 2011, now U.S. Pat. No. 8,737,542 which claims benefit under 35 USC §119(e) to U.S. provisional application Ser. No. 61/294,423, filed on Jan. 12, 2010, which are both hereby wholly incorporated by reference.

FIELD

Aspects of the present invention relate generally to the field of data transmission and more specifically to timing recovery using a low latency tree search algorithm for data detection.

DESCRIPTION OF THE RELATED ART

In high-speed data transmission channels, for example backplane 10GBASE-KR or fiber 10GBASE-LRM channels, channel induced amplitude attenuation, group delay, and pulse spreading may result in significant inter-symbol interference (ISI). Conventional high-speed receivers often implement a decision feedback equalizer (DFE) to deal with the group delay distortion and to compensate for induced ISI by decoding or detecting the value of the received bits.

Figure 1:
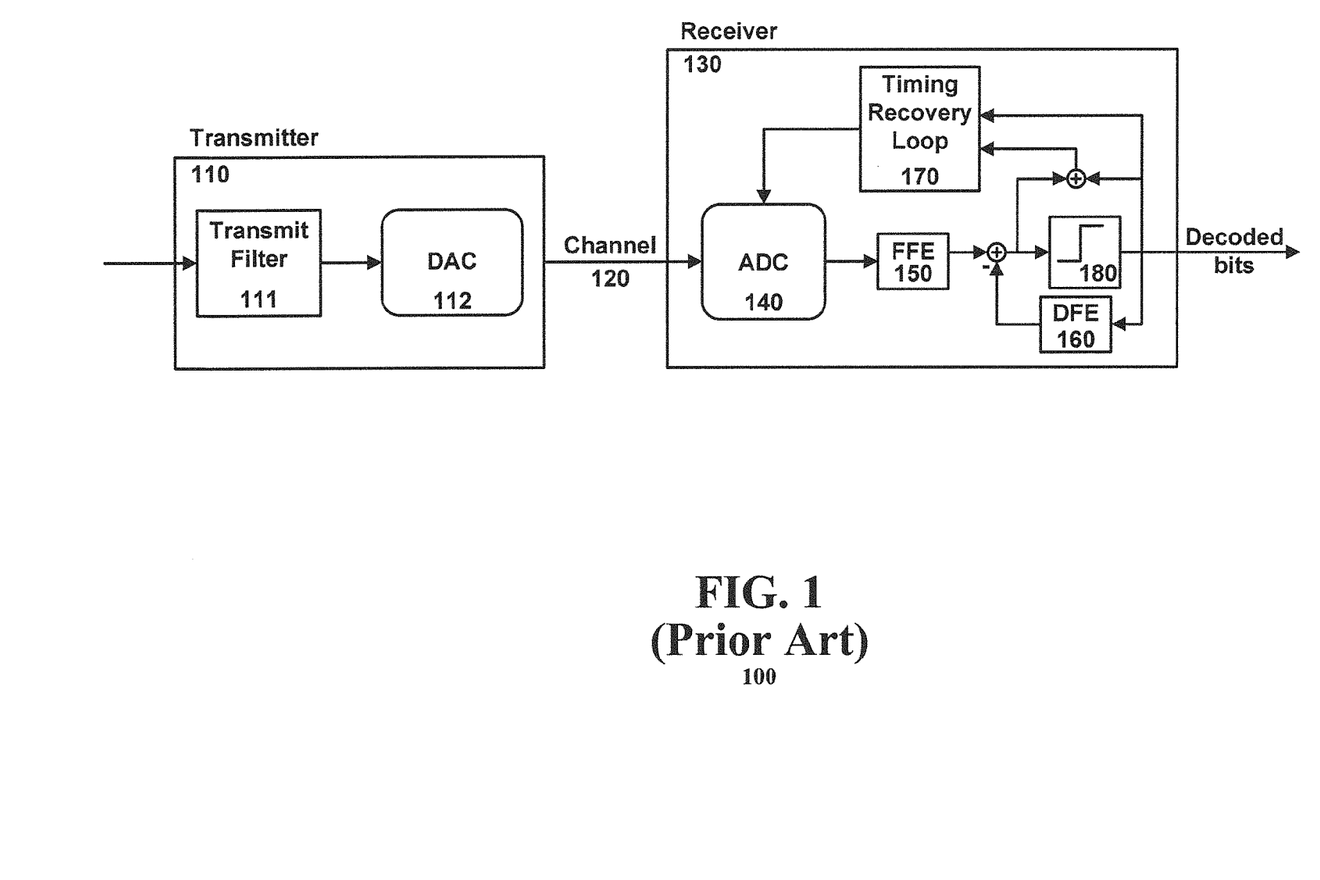
FIG. 1 is a simplified block diagram illustrating a conventional data transmission system.

FIG. 1 is a simplified block diagram illustrating a conventional high-speed data transmission system. A data transmission system 100 may include a transmitter 110 with a transmit filter 111 and a digital-to-analog converter (DAC) 112. The analog signal may be transmitted on a channel 120 and received at receiver 130. Receiver 130 may include an analog-to-digital converter (ADC) 140, a feed-forward equalizer (FFE) 150, a decision feedback equalizer (DFE) 160, a timing recovery loop 170, and a slicer 180. The FFE 150 may filter the input signal to minimize the effect of precursor ISI (ISI induced by bits not yet detected). The DFE 160 may be implemented to minimize the effect of the post-cursor ISI (ISI induced by previously detected bits). Then, the equalized signal input into slicer 180 may be substantially free of ISI. The slicer 180 may be a data detector or limiter that may determine whether to output a +1 bit or a −1 bit based on the sign of the equalized signal.

The timing recovery loop 170 may determine the optimal sampling phase for the ADC to maximize the signal-to-noise ratio (SNR). The optimal sampling phase may be determined by calculating the error existent in the equalized signal and using that calculation to anticipate the proper sampling phase needed to minimize error in the conversion of the received signals. However, the implementation of a data transmission system shown in FIG. 1 may not be desirable where error introduced by the DFE 160 may be fed back and replicated throughout the timing recovery loop 170.

Figure 2:
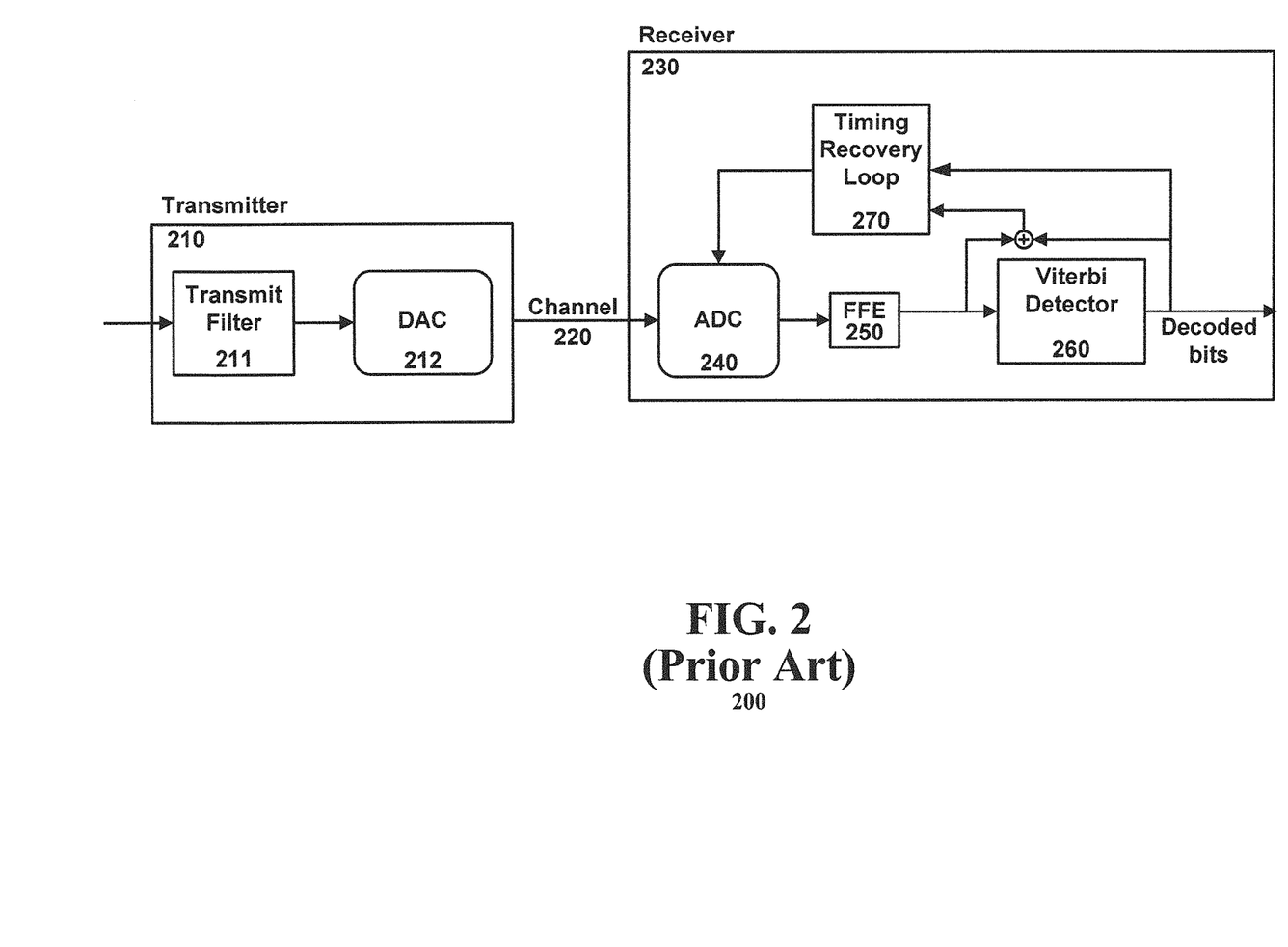
FIG. 2 is a simplified block diagram illustrating a conventional data transmission system implemented with a Viterbi detector.

One method for mitigating error propagation in data transmission systems having complex channels has conventionally involved the implementation of a Viterbi detector. FIG. 2 is a simplified block diagram illustrating a conventional high-speed data transmission system implemented with a Viterbi detector. Similar to the system 100 shown in FIG. 1, system 200 may include a transmitter 210 with a transmit filter 211 and a DAC 212. The converted signal may be transmitted on channel 220 and received at receiver 230. Receiver 230 may include an ADC 240, an FFE 250, a timing recovery loop 270, and a Viterbi detector 260. As is known in the art, Viterbi detector 260 may be a maximum likelihood sequence detector capable of accurately decoding the bits of the equalized signal.

In receivers implemented with a timing recovery loop, like those in data transmission system 100 and data transmission system 200, the jitter bandwidth that the receiver is able to track, and therefore the signal-to-noise ratio (SNR), may be directly impacted by the loop latency. Loops with smaller latencies may have larger tracking bandwidths. Unfortunately, Viterbi detector implementation is complex and may introduce significant latency into the signal detection and timing recovery loop. Each sequence determination by a Viterbi detector may require hundreds of clock cycles. Therefore, in a high speed system, the high loop latency inherent in Viterbi detection may have a significant and negative impact on the timing recovery loop 270, and may result in a very low tracking bandwidth thereby limiting the jitter that the receiver 230 is able to track, and may significantly degrade the signal-to-noise ratio (SNR) due to untracked jitter.

Accordingly, there is a need in the art for a receiver that negates ISI without inducing significant latency.

BRIEF DESCRIPTION OF THE DRAWINGS

The foregoing and other aspects of various embodiments of the present invention will be apparent through examination of the following detailed description thereof in conjunction with the accompanying drawing figures in which similar reference numbers are used to indicate functionally similar elements.

DETAILED DESCRIPTION

At speeds of 1 Gbps or lower, oversampled CDR is very common. However, at speeds such as 10 Gbps, the receiver has to perform baud-rate timing recovery. Since such schemes are dependent on the error signal, there is also a high latency associated with the scheme. A data decoder implemented with a tree decoding algorithm may be used for timing recovery in high-speed applications and may provide a low latency, low power alternative to traditional timing recovery methods. A tree decoder may be implemented along with a Viterbi detector to provide accurate results when decoding the input data and to maintain efficient timing recovery.

Figure 3:
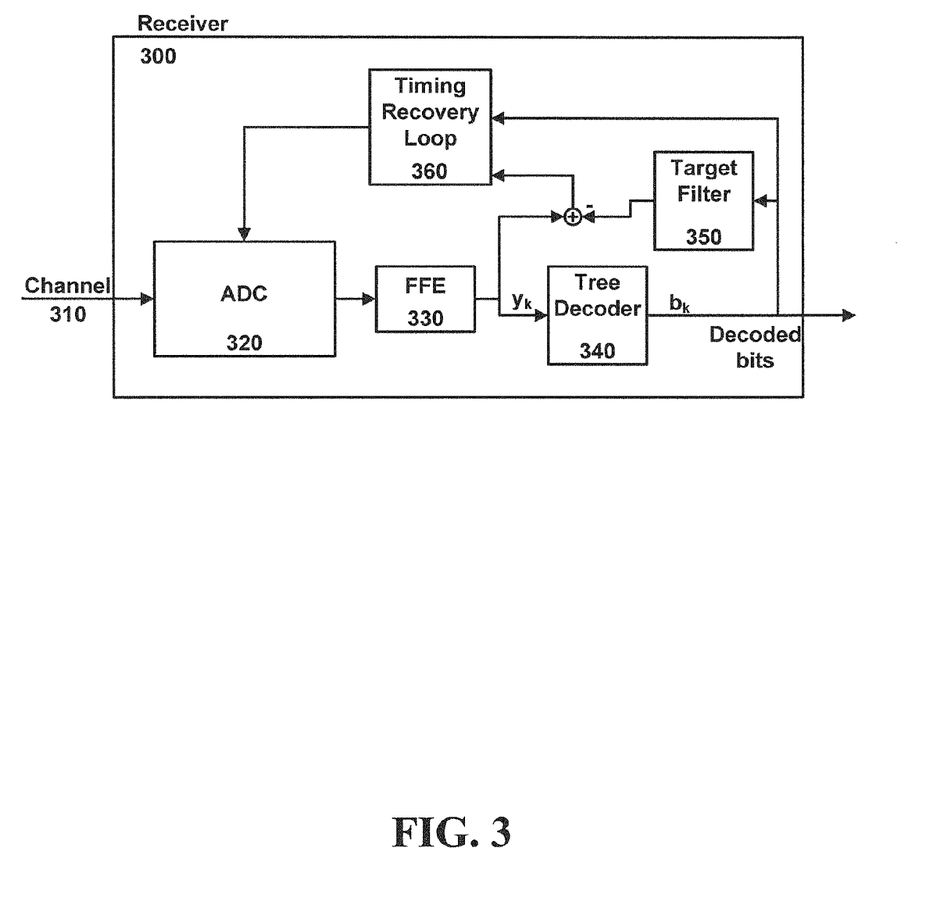
FIG. 3 is a simplified block diagram of an embodiment of a data receiver implemented with a tree search decoder.

FIG. 3 is a simplified block diagram of an embodiment of a data receiver implemented with a tree search decoder. Receiver 300 may receive an input signal from channel 310 and may include an analog-to-digital converter 320, an FFE 330, a tree decoder module 340, a target filter 350 and a timing recovery loop 360. Channel 310 may be any transmission channel provided by communications or computer networks, for example either a wired or wireless network or any high-speed channel, for example backplane 10GBASE-KR or fiber 10GBASE-LRM. The FFE 330 may minimize the effect of precursor ISI, limit noise, and equalize the channel. As shown in FIG. 3, the FFE output sampled at instant k is denoted by $y_k$.

Target filter 350 may be a filter with taps set to limit the post-cursor ISI from the detected bits thereby approximating desired input signal. In an embodiment using a four-bit sequence, target filter 350 may have four taps designated by $\{g_0, g_1, g_2, g_3\}$ where $g_0$-$g_3$ may represent the target coefficients.

The tree decoder module 340 may be implemented to decode the bits of the equalized channel with minimum latency. In an embodiment of the present invention, the tree decoder module 340 may be implemented with a tree having multiple potential states. In an exemplary embodiment having 16 states, the decoding delay of the tree decoder module 340 may be represented by Equation 1, and the decoding delay of the tree decoder module 340 may be 3. A delay of 3 indicates that bit $b_k$ may be decoded when $y_{k+3}$ is output by the FFE 350.

$$(\log_2(N_{STATES})-1) \qquad \text{Eq. 1}$$

According to another feature, tree decoder module 340 may decode the same number of bits with fewer potential states by implementing a sequence feedback in the branch metric computation.

Figure 4:
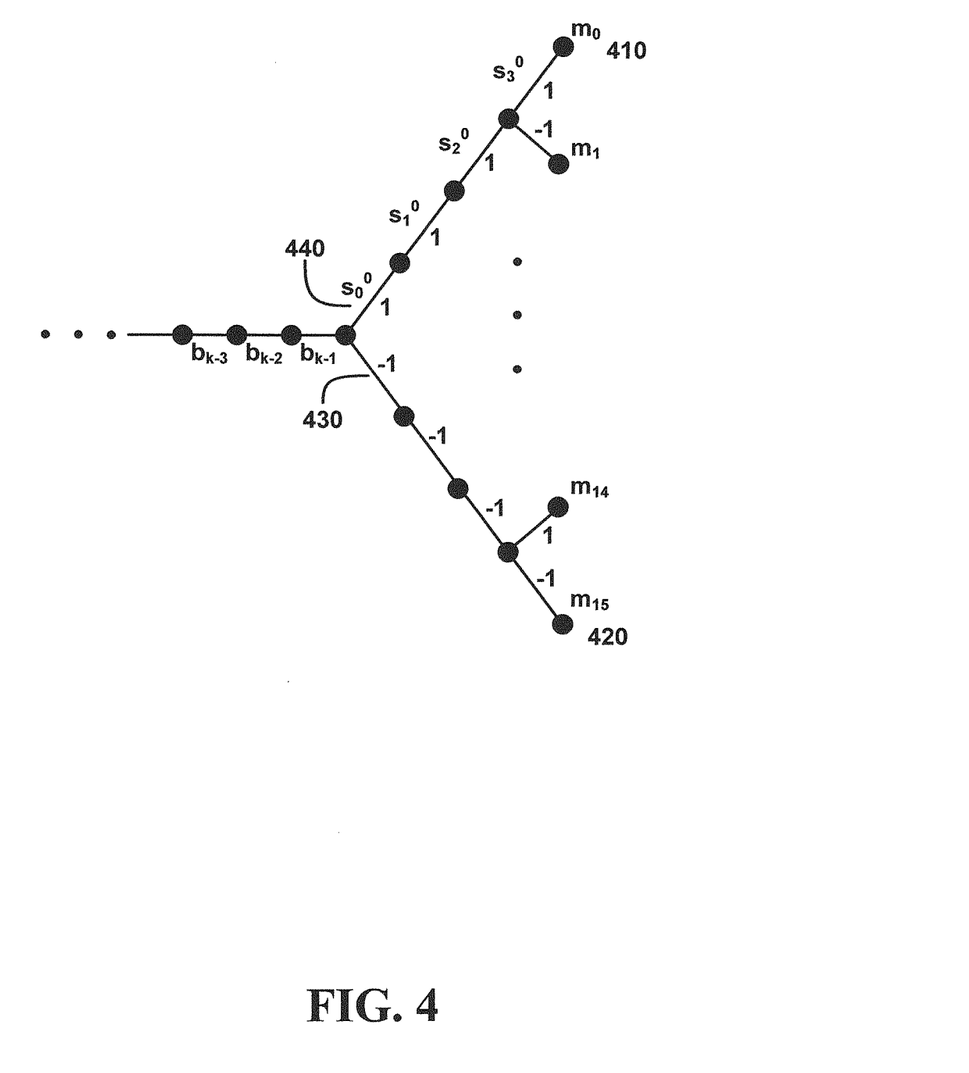
FIG. 4 shows one embodiment of a state tree for a tree decoder.

FIG. 4 shows one embodiment of a state tree for the tree decoder module 340. A bit sequence for each of the 16 potential states, represented by each distinct path in the tree, may be labeled as $s_0$ through $s_{15}$ where $s_0$ is the topmost path and may be represented as $s^0 = \{1,1,1,1\}$ and the bottommost path may be represented as $s^{15} = \{-1, -1, -1, -1\}$. A branch metric $\lambda_j$, representing the distance metric for the target sequence at the current level of the tree, for branch j may be calculated in accordance with Equation 2.

$$\lambda_j = -\left(y_{k+3} - \sum_{i=0}^{3} g_i s_{3-i}^j\right)^2 \qquad \text{Eq. 2}$$

A path metric representing a Euclidean metric for the negative of the distance between the received signal and a certain branch, may then be calculated in accordance with Equation 3.

$$m_j^{k+3} = \hat{m}_j^{k+2} + \lambda_j, \, j \in \{0, 1, \ldots, 15\} \text{ where} \qquad \text{Eq. 3}$$

$$\hat{m}_j^{k+2} = \begin{cases} m_{\lfloor \frac{j}{2} \rfloor}^{k+2}, & \text{if } b_{k-1} = 1 \\ m_{\lfloor \frac{j}{2} \rfloor + 8}^{k+2}, & \text{if } b_{k-1} = -1 \end{cases}$$

Once the path metric for each state in the state tree is calculated, the $k^{th}$ bit may be decoded as a 1 if the largest metric lies in the top half of the tree, otherwise, the $k^{th}$ bit may be decoded as $-1$. Then, every metric in the top half of the tree may need to be compared to every metric in the bottom to determine the decoded bit. Alternatively, the determination may be made by summing the exponential of all the top half metrics and comparing that value to the sum of the exponentials of the bottom half metrics in accordance with Equation 4.

$$b_k = 1 \text{ if } \sum_{j=0}^{7} \exp(m_j^{k+3}) > \sum_{j=8}^{15} \exp(m_j^{k+3}), \text{ else } b_k = -1 \qquad \text{Eq. 4}$$

Returning to FIG. 3, while the tree decoder module 340 may decode the equalized bits with limited delay appropriate for proper timing recovery, the accuracy of the decoded bits may still suffer from error propagation. To produce a higher quality of output without losing the benefits to the timing recovery loop 360 gained by the small latency of the tree decoder module 340, a Viterbi detector may be implemented as shown in FIG. 5.

Figure 5:
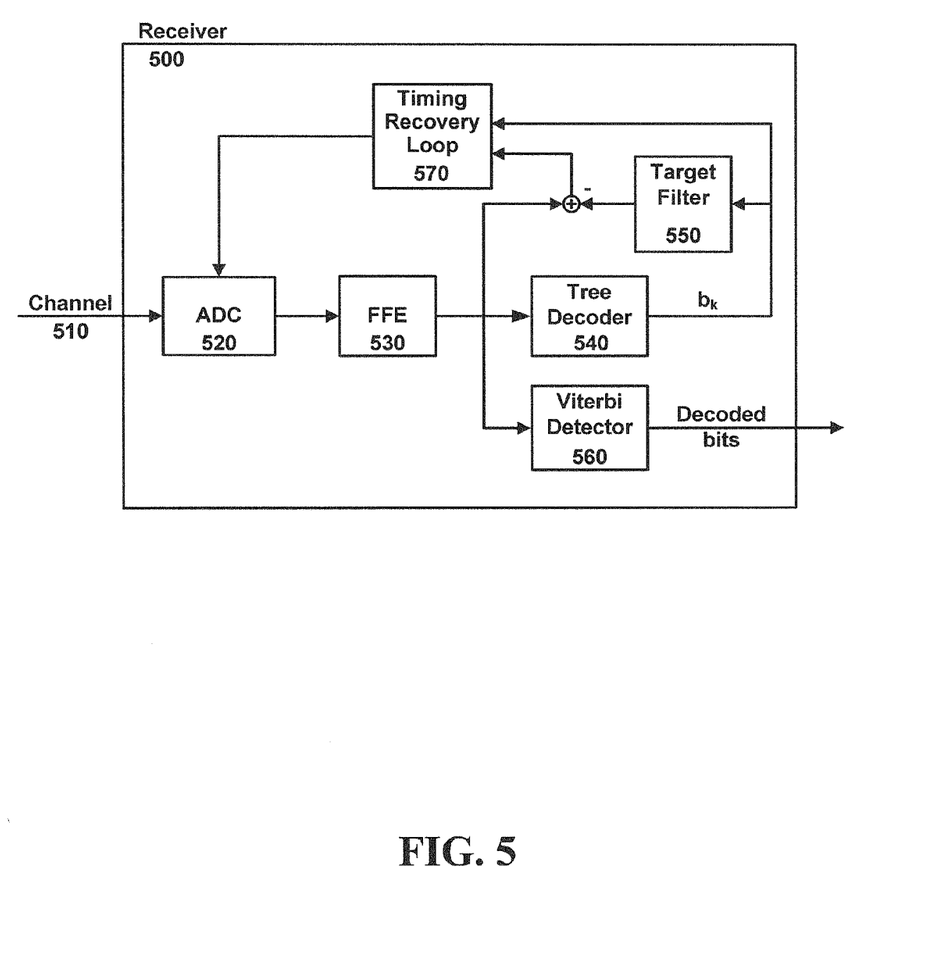
FIG. 5 is a simplified block diagram of an embodiment of a data receiver implemented with a tree search decoder and a Viterbi detector.

FIG. 5 is a simplified block diagram of an embodiment of a data receiver implemented with a tree search decoder (a non-Viterbi decoder) and a Viterbi decoder/detector. Receiver 500 may receive an input signal from channel 510 and may include an ADC 520, an FFE 530, a tree decoder module 540, a target filter 550, a Viterbi detector 560 and a timing recovery loop 570. The tree decoder module 540 and target filter 550 may be implemented as described above with reference to FIG. 3. Additionally, Viterbi detector 560 may operate as previously described with reference to FIG. 2. However, the output of the receiver, the decoded bits, may be the decoded results output from the Viterbi detector 560 rather than from the tree decoder module 540. However, the Viterbi decoded bits have no impact on the timing recovery loop 570.

Figure 6:
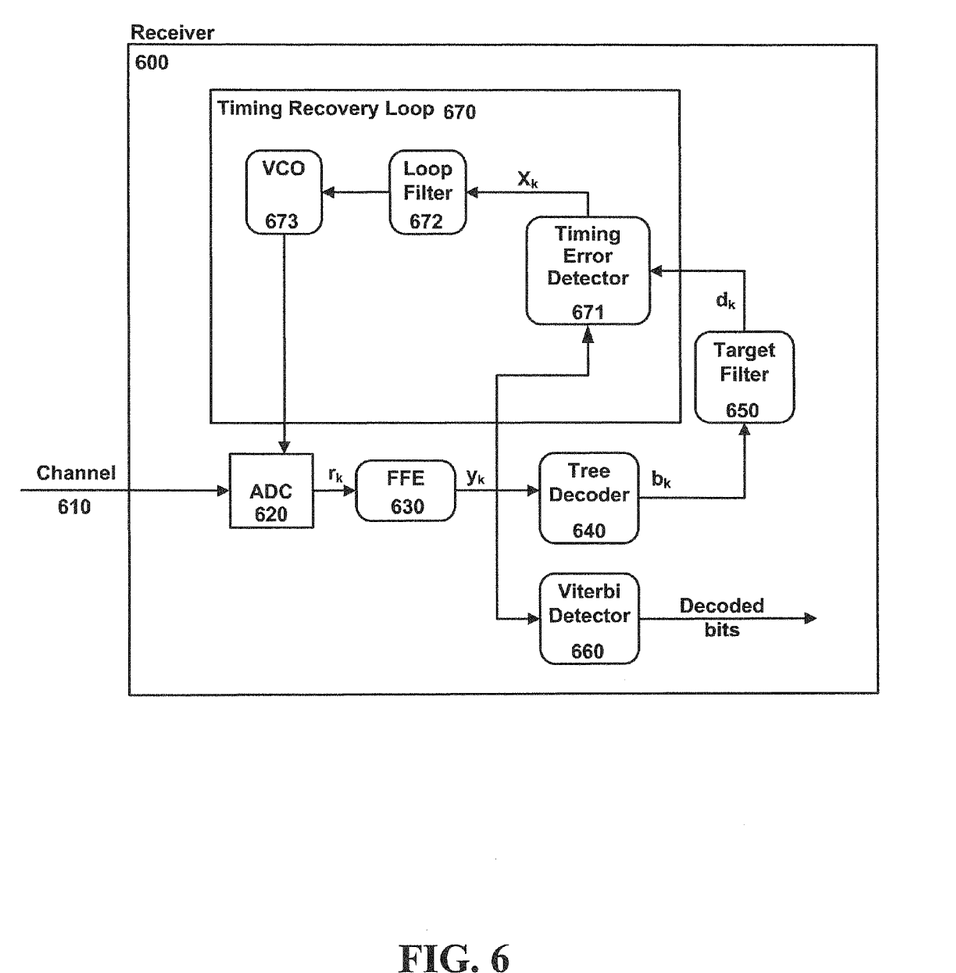
FIG. 6 is a simplified block diagram of an embodiment of a data receiver with timing recovery loop details.

FIG. 6 is a simplified block diagram of an embodiment of a data receiver with detail in the timing recovery loop. Receiver 600 may receive an input signal from channel 610 and may include an ADC 620, an FFE 630, a tree decoder module 640, a target filter 650, a Viterbi detector 660 and a timing recovery loop 670. The tree decoder module 640, target filter 650, and Viterbi detector 660 may each be implemented as described above with reference to FIG. 5.

Timing recovery loop 670 may be implemented digitally to obtain frequency and phase lock at the receiver and further minimize ISI. Conventional oversampling of the analog-to-digital conversion to obtain multiple samples per symbol period and achieve frequency and phase lock is not feasible in high-speed applications, thus baud rate timing recovery is preferable. Zero-forcing (ZF) timing recovery may be implemented at baud rate while still achieving near optimal timing results. Then, as shown in FIG. 6, an embodiment of the timing recovery loop 670 may implement a timing error detector 671, a loop filter 672, and a voltage-controlled oscillator (VCO) 673.

Timing error detector 671 may be implemented to determine sampling phase error $\chi_k$ by de-correlating an error signal $e_k$ with the derivative of a desired received signal. This has the effect of minimizing the sampling phase error and automatically minimizes the error power. The detected signal $d_k$ may be calculated as the decoded bits $b_k$, filtered through the target filter. The error signal $e_k$ may be determined as the difference between the detected signal $d_k$ and the received signal $y_k$ in accordance with Equation 5.

$$e_k = y_k - (b * g)_k \qquad \text{Eq. 5}$$

Then, the timing error detector 671 may determine the sampling phase error $\chi_k$ in accordance with Equation 6 where the instantaneous sampling phase is represented by $\psi_k$.

$$\chi_k = \frac{\partial e_k^2}{\partial \psi_k} = 2e_k \frac{\partial y_k}{\partial \psi_k} \approx 2e_k(y_{k+1} - y_{k+1}) \qquad \text{Eq. 6}$$

The derivative of the FFE output $y_k$ may be approximated in the digital domain using a $(1-D^2)$ filter, eliminating the need for a separate sampler to obtain the derivative of $y_k$. However, $y_k$ may still contain residual ISI and other noise (i.e. thermal noise or phase noise), which may lead to a drift in the sampling phase. Sampling phase drift may be countered by replacing $y_k$ with $d_k$ yielding Equation 7.

$$\chi_k = 2e_k(d_{k+1} - d_{k-1}) \qquad \text{Eq. 7}$$

The loop filter 672 may then filter the timing error $\chi_k$ and the frequency, and the phase of the VCO 673 may then be adjusted by the filtered timing error. The VCO 673 may then output the timing control information. The timing control information may include a sampling clock signal that may drive the ADC 620. The effect of the timing control information on the sampling phase may then be illustrated by Equation 8 where $K_p$ and $K_f$ may represent the first and second order loop constants respectively.

$$\psi^{k+1} = \psi^k + K_p\chi_k + K_{f,out}^k \text{ where } K_{f,out}^k = K_{f,out}^{k-1} + K_f\chi_k \qquad \text{Eq. 8}$$

Once the timing recovery loop 670 has completed acquisition of the timing phase and is simply tracking the sampling phase, the update rate of the timing recovery may be reduced. Then only a portion of the input bits need be decoded by the tree decoder module 640 and input into the timing recovery loop 670. The update rate may be determined by the available power in the receiver 600.

As discussed above, FIG. 6 is a simplified block diagram of the basic architecture of an embodiment of the receiver. The receiver may be embodied as a hardware system, in which case, the blocks illustrated in FIG. 6 may correspond to circuit sub-systems within a receiver system. The circuit sub-systems may be implemented together on a single integrated circuit or a single chip. Alternatively, the receiver may be embodied as a non-transitory computer medium that stores a software system configured to perform the disclosed functions. In which case the blocks illustrated may correspond to program modules within a receiver software program. In yet another embodiment, the receiver may be a hybrid system involving both hardware circuit systems and software programs. In any event, the basic flow through the receiver, with input from a channel and an output of decoded bits, results.

Additionally, it is noted that the arrangement of the blocks in FIG. 6 does not necessarily imply a required set of components, nor is it intended to exclude other possibilities. For example, the functions depicted by blocks 650 and 670 may be implemented by a single functional unit, or may be eliminated in some instances.

Figure 7:
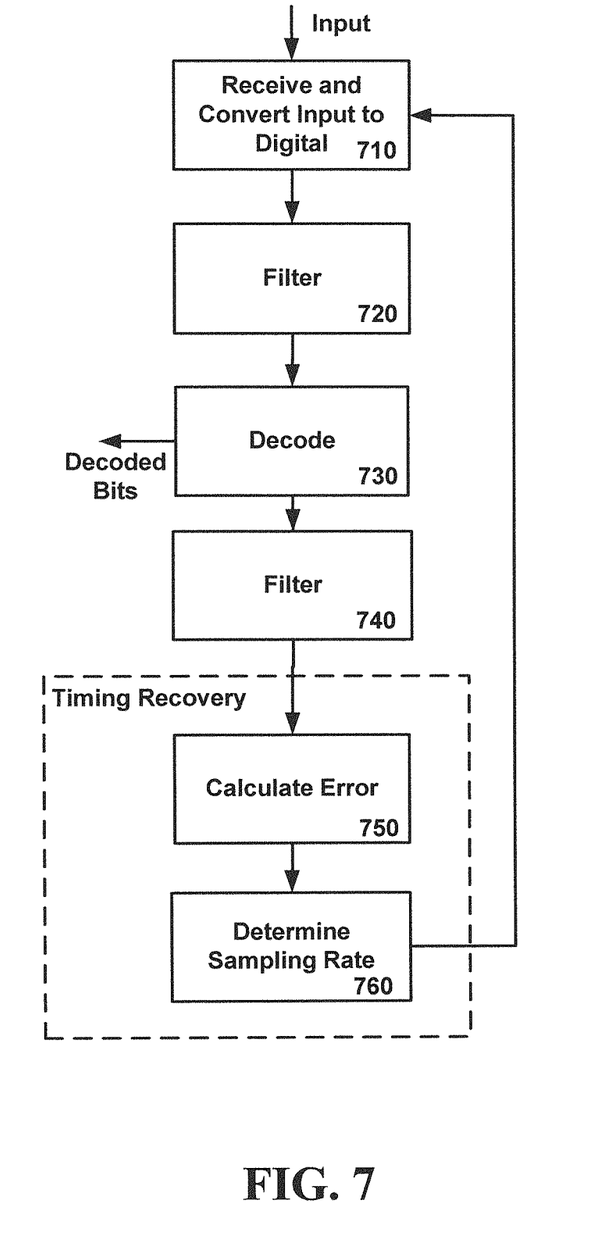
FIG. 7 is a simplified flow diagram illustrating decoding received data to limit ISI according to an embodiment of the present invention.

FIG. 7 is a simplified flow diagram illustrating decoding received data to limit ISI according to an embodiment of the present invention. As previously noted, ISI may be introduced in a signal transmitted over a channel that may cause amplitude attenuation, pulse spreading, or group delay leading to signal distortion. A received signal may be adaptively equalized to limit the effect of the ISI introduced during transmission.

At 710, an analog signal may be received and converted to digital. To effectively convert the signal, it may be sampled in set intervals, the number of samples taken per time period (e.g. per second) known as the sampling rate. At 720, the converted digital sample may be filtered to limit the precursor ISI and/or other noise existent in the sample. Precursor ISI is noise that may be introduced in the signal due to a portion of the signal not yet received.

The filtered sample may be decoded at 730 to determine the probable value of the received signal. During the analog to digital conversion at 710, the signal may not have been sampled at the peak of the signal waveform, or the ISI and noise existent in the signal may have significantly impacted the sampled value of the signal. Therefore, decoding is necessary to detect and output the best possible result. At 730, a tree search algorithm may be implemented to decode the filtered sample. The tree search algorithm is further explained below with reference to FIG. 8.

After the filtered sample is decoded, the decoded bits may be output as the detected received value and may additionally be used for timing recovery. At 740, the decoded sample may be filtered with a target filter to limit post cursor ISI. At 750, the filtered decoded sample may be used with the filtered sample output from 720 to calculate the error in the digital sample in accordance with Equation 7. At 760, the calculated error may be used to determine an appropriate sampling phase to further minimize the sample error. That sampling phase may then be used to convert future input signals into digital samples at 710.

Figure 8:
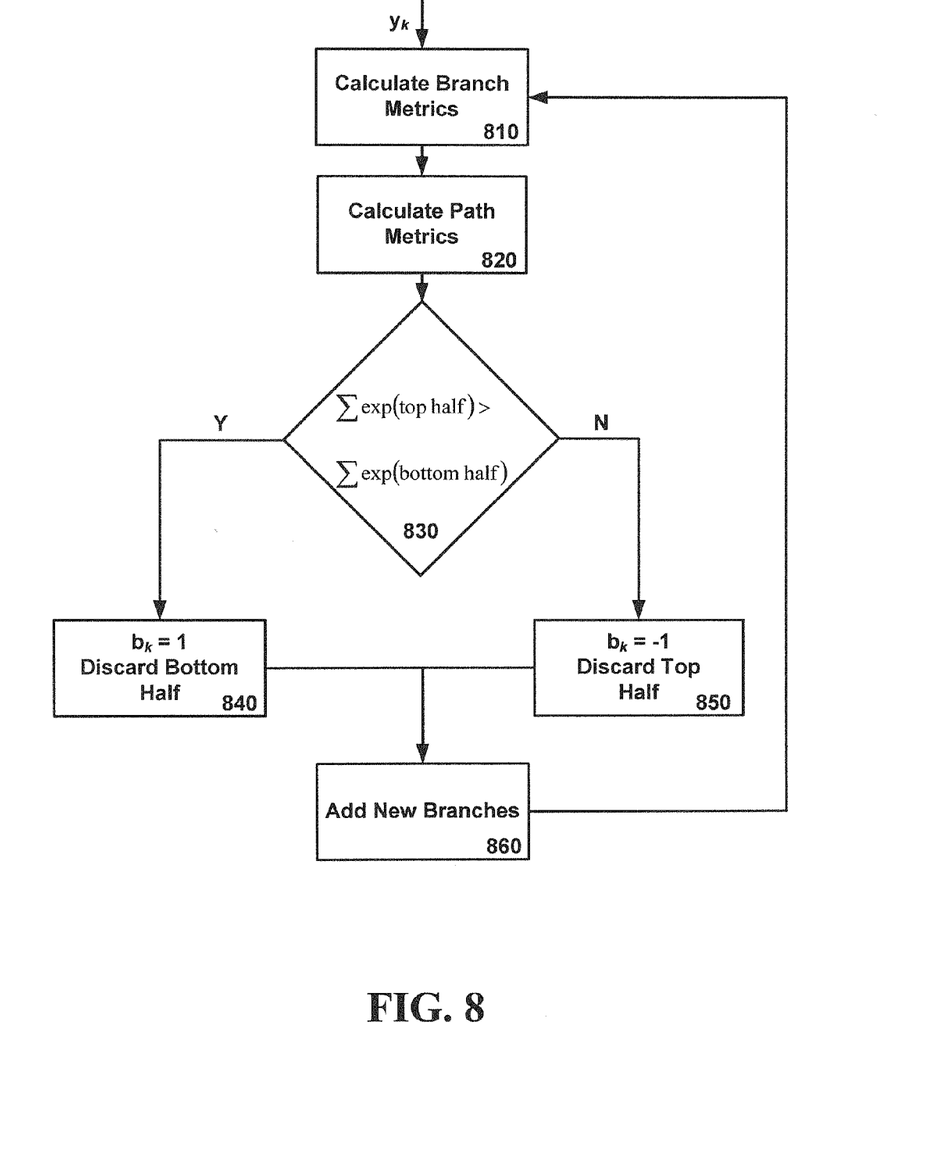
FIG. 8 is a simplified flow diagram illustrating decoding sampled data using a tree search algorithm according to an embodiment of the present invention.

FIG. 8 is a simplified flow diagram illustrating decoding sampled data using a tree search algorithm according to an embodiment of the present invention. A tree search algorithm may use as metric the negative of the squared Euclidean distance between the filtered sample $y_k$ and the target sample, where the target sample represents the value that should be received when ISI and noise are reduced to a predefined level, from the signal and when the sampling phase is accurate. To utilize the tree search algorithm, a branch metric for each branch may be calculated in accordance with Equation 2, at 810.

At 820, a path metric may be calculated for each path in accordance with Equation 3. After the relevant metrics have been calculated, the decoded bit, $b_k$, for the filtered sample, $y_k$, may be determined. The bit $b_k$ may be decoded to be a +1 if the largest metric lies in the top half of the tree, otherwise the bit may be decoded to be a −1. This determination may be accomplished by comparing every metric in the top half of the tree with every metric in the bottom half of the tree. However, if each bit may be considered to be independent and uniformly distributed within {±1}, then the decoded bit may be determined as shown at 830, and in accordance with Equation 4. Then, if $\Sigma$ exp(top−half)>$\Sigma$ exp(bottom−half) at 830, at 840, $b_k$ may be determined as $b_k$=+1. Additionally, because the first bit of a detected sequence may be positive, the branch metrics associated with the remaining bottom half of the tree (with reference to FIG. 4, all branches following and including branch 430) may be discarded while the branch metrics of the top half of the tree may persist. However, if at 830 $\Sigma$ exp(top−half)≤$\Sigma$ exp(bottom−half), at 850, $b_k$ may be determined as $b_k$=−1 and, because the first bit in a sequence may be determined to be −1, the branch metrics associated with the top half of the tree (with reference to FIG. 4, all branches following and including branch 440) may be discarded while the branch metrics of the bottom half of the tree may persist.

After $b_k$ is determined, and half of the tree may be discarded, at 860, the tree may be expanded to again include 16 states by adding new branches to the remaining end branches (with reference to FIG. 4, the end branches are the branches at $m_0$ 410 through $m_{15}$ 420). Thus, the branch metrics may be persistent and accumulative over time. Then, with a complete and partially persistent tree, the next value of $b_{k+1}$ may be determined by returning to 810 with next filtered sample $y_{k+1}$.

Figure 9:
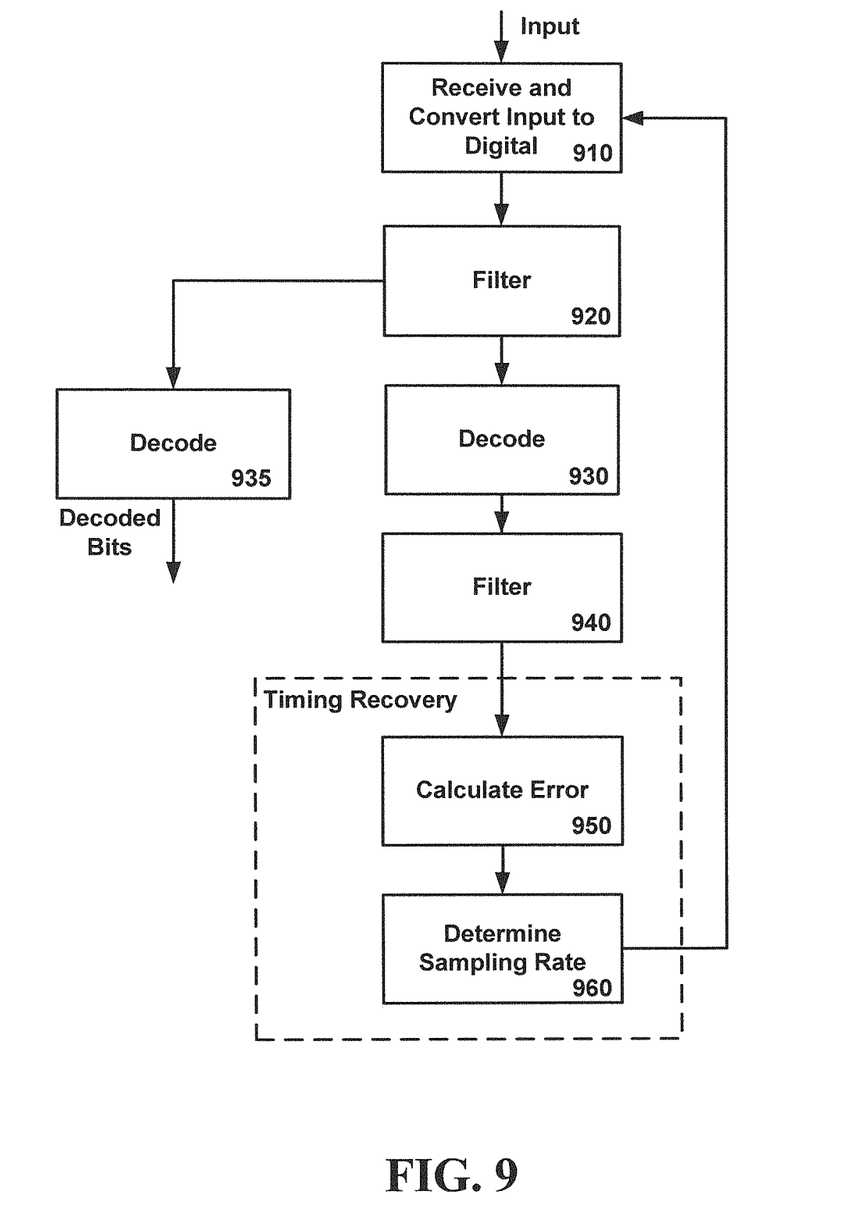
FIG. 9 is a simplified flow diagram illustrating decoding received data to limit ISI with separate decoders for output and timing recovery according to an embodiment of the present invention.

FIG. 9 is a simplified flow diagram illustrating decoding received data to limit ISI with separate decoders for output and timing recovery according to one feature of the present invention. Similarly to the embodiment illustrated in FIG. 7, in FIG. 9 at 910, an input signal is received and converted to a digital sample. At 920, the converted digital sample may be filtered and at 930, decoded. At 940, the decoded sample may be filtered. At 950, the error in the digital sample may be calculated using the filtered decoded sample calculated at 940 and the filtered sample calculated at 920. At 960, the calculated error may be used to determine an appropriate sampling phase that may then be used at 910 for future input signals.

However, the decoded sample determined at 930 may be used for timing recovery while an alternate decoder may be used to decode the filtered sample with higher accuracy. For example, a Viterbi detection algorithm may be implemented at 935 to decode the filtered sample. Using two different decoding algorithms may allow the advantages of both to be utilized in the system. For example, the significant latency inherent with the Viterbi algorithm may not affect the timing recovery, and the error propagation inherent with the tree search algorithm may not affect the accuracy of the output decoded bits.

It is noted that the arrangement in FIGS. 7-9 do not necessarily imply a particular order or sequence of events, nor is it intended to exclude other possibilities. For example, the calculations depicted at 810, 820 and 830 may occur substantially simultaneously with each other; additionally, the operations depicted at 740 and 750 may be combined into a single operation or may be eliminated in some instances.

While the invention has been described in detail above with reference to some embodiments, variations within the scope and spirit of the invention will be apparent to those of ordinary skill in the art. Thus, the invention should be considered as limited only by the scope of the appended claims.

What is claimed is:

1. A data receiver comprising:
   an analog-to-digital converter configured to convert an analog signal into a digital signal based at least in part on a first sampling phase;
   a non-Viterbi decoder configured to decode the digital signal into a first set of decoded bits using a non-Viterbi tree search algorithm and outputting the first set of decoded bits on a feedback signal path;
   wherein the feedback signal path is connected between the non-Viterbi decoder and a timing recover module;
   a Viterbi decoder configured to decode the digital signal from the analog-to-digital converter into a second set of decoded bits with a Viterbi detection algorithm;
   wherein a decoded output from the data receiver is the second set of decoded bits from the Viterbi decoder;
   wherein the timing recovery module is configured to:
      calculate an error value for the digital signal using the first set of decoded bits from the feedback signal path while not using the second set of decoded bits from the Viterbi decoder; and
      calculate a second sampling phase based, at least in part on the calculated error value, wherein the second sampling phase is provided to the analog-to-digital converter to be used for converting a subsequently received analog signal into a digital signal;
   wherein the non-Viterbi decoder is configured to perform the non-Viterbi tree search algorithm comprising:
      calculating path metrics for potential states of a tree for determining a decoded bit; and
      discarding portions of the tree based at least in part on the path metrics until the digital signal is decoded.

2. The data receiver of claim 1, wherein the non-Viterbi tree search algorithm is configured to search the tree that has multiple potential states in order to decode the digital signal.

3. The data receiver of claim 2, wherein the tree-search algorithm is configured to implement a sequence feedback to decode bits of the converted digital signal using less than all of the potential states of the tree.

4. The data receiver of claim 1, wherein the second set of decoded bits outputted from the Viterbi decoder is not fed back to the timing recovery module and does not affect calculating the second sampling phase.

5. The data receiver of claim 1, wherein the non-Viterbi decoder is configured to perform the non-Viterbi tree search algorithm including:
   comparing upper path metrics in a top half of the tree to lower path metrics in a lower half of the tree; and
   in response to the upper path metrics having values greater than the lower path metrics, discarding the lower half of the tree.

6. The data receiver of claim 1, further comprising a target filter configured to remove post-cursor inter-symbol interference (ISI) from the first set of decoded bits, wherein the target filter is connected between the non-Viterbi decoder and the timing recovery module.

7. The data receiver of claim 1, wherein the tree search algorithm is configured to execute with a lower latency than the Viterbi detection algorithm.

8. A method comprising:
   converting a received analog signal into a digital signal using a first sampling phase;
   decoding, by a first decoder, the digital signal into a first decoded signal using a non-Viterbi tree search algorithm;
   decoding, by a second decoder, the digital signal into a second decoded signal with a Viterbi detection algorithm;
   calculating an error value for the digital signal using the first decoded signal from the non-Viterbi tree search algorithm;
   calculating a second sampling phase based, at least in part on the calculated error value, wherein the second sampling phase is used for converting a subsequently received analog signal; and
   outputting the second decoded signal from the second decoder as a result of decoding the digital signal;
   wherein a frequency of the first sampling phase is used with the calculated error value to calculate the second sampling phase, and
   wherein the frequency is modified based at least in part on the calculated error value.

9. The method of claim 8, wherein the frequency is decreased based, at least in part, on an amount of available power.

10. The method of claim 8, wherein the frequency is decreased after a timing phase acquisition period has lapsed.

11. A data receiver comprising:
   an analog-to-digital converter (ADC) configured to convert a received input signal to a digital signal;
   a tree-search module configured to decode the digital signal into a first decoded signal by searching a tree having potential states, wherein the tree-search module is a non-Viterbi detector;

a Viterbi detector configured to decode the digital signal into a Viterbi decoded signal;

a timing recovery module configured to determine a sampling phase based on the first decoded signal of the tree-search module;

wherein the receiver is configured to output the Viterbi decoded signal; and wherein the tree-search module is further configured to:
  calculate path metrics for the potential states of the tree; and
  discard branches of the tree until decoded bits are determined for the digital signal.

12. The data receiver of claim 11, wherein in response to upper path metrics of the tree having values less than lower path metrics of the tree for a given signal, the tree-search module is configured to discard the upper half of the tree from the decoding process.

13. The data receiver of claim 11, wherein the tree-search module is further configured to:
  determine a bit of the first decoded signal from the non-Viterbi detector using remaining branches of the tree after the other branches are discarded.

14. The data receiver of claim 11, wherein the sampling phase drives the analog-to-digital converter to reduce oversampling of subsequently received input signals.

15. The data receiver of claim 11, wherein the data receiver is configured such that the Viterbi decoded value has no impact on the timing recovery module.

16. The data receiver of claim 11, wherein the timing recovery module is configured to obtain a predetermined frequency at the analog-to-digital converter.

17. The data receiver of claim 11, wherein the data receiver is configured such that the Viterbi detector does not output the Viterbi decoded value to the timing recovery module.

18. The data receiver of claim 11, wherein the timing recovery module is configured to output the sampling phase to the analog-to-digital converter.

19. The data receiver of claim 11, wherein the timing recovery module is configured to:
  calculate an error value for the decoding of the digital signal using the first decoded signal from the non-Viterbi detector while not using the Viterbi decoded signal from the Viterbi decoder; and
  calculate a second sampling phase based, at least in part on the calculated error value, wherein the second sampling phase is provided to the analog-to-digital converter to be used for converting a subsequently received analog signal into a digital signal.

20. The data receiver of claim 11, further comprising a feedback signal path configured to provide the first decoded signal from the tree-search module to the timing recovery module; and
  wherein the data receiver does not include a signal path from the Viterbi detector to the timing recover module.

* * * * *